(12) United States Patent
Skopek et al.

(10) Patent No.: US 8,241,194 B2
(45) Date of Patent: Aug. 14, 2012

(54) PROCESS FOR PRODUCING WEB SECTIONS FROM A FLEXIBLE WEB MATERIAL AS WELL AS FOR PRODUCING PACKING CONTAINERS

(75) Inventors: Peter Skopek, Klosterneuburg (AT); Herbert Fuerst, Weissenbach/Triesting (AT)

(73) Assignee: Starlinger & Co Gesellschaft m.b.H., Vienna (AT)

( * ) Notice: Subject to any disclaimer, the term of this patent is extended or adjusted under 35 U.S.C. 154(b) by 169 days.

(21) Appl. No.: 12/525,708

(22) PCT Filed: Feb. 4, 2008

(86) PCT No.: PCT/AT2008/000036
§ 371 (c)(1),
(2), (4) Date: Aug. 4, 2009

(87) PCT Pub. No.: WO2008/095212
PCT Pub. Date: Aug. 14, 2008

(65) Prior Publication Data
US 2010/0029455 A1 Feb. 4, 2010

(30) Foreign Application Priority Data
Feb. 5, 2007 (AT) .................................. A 188/2007

(51) Int. Cl.
*B31B 1/16* (2006.01)
*B31B 1/14* (2006.01)
(52) U.S. Cl. ......... 493/224; 493/231; 493/238; 493/264
(58) Field of Classification Search ................. 53/452, 53/456; 493/224, 267, 227, 231, 233, 238, 493/264
See application file for complete search history.

(56) References Cited

U.S. PATENT DOCUMENTS

| | | | |
|---|---|---|---|
| 2,855,832 A | 10/1958 | Mengis | |
| 3,445,055 A * | 5/1969 | Port et al. ........................ | 383/32 |
| 3,760,153 A * | 9/1973 | Davies et al. ................. | 219/384 |
| 3,790,744 A * | 2/1974 | Bowen ..................... | 219/121.69 |
| 4,008,850 A | 2/1977 | Goodrich | |
| 4,118,619 A * | 10/1978 | McArthur et al. ......... | 219/121.7 |
| 4,274,896 A | 6/1981 | Bosse | |
| 4,378,480 A * | 3/1983 | Langhans ................. | 219/121.7 |
| 4,404,452 A * | 9/1983 | Cashwell .................... | 219/121.7 |
| 4,439,663 A * | 3/1984 | Lilly et al. ................. | 219/121.7 |
| 4,473,432 A * | 9/1984 | Leader et al. ................. | 156/582 |
| 5,421,805 A * | 6/1995 | Baxter et al. ................. | 493/226 |
| 5,684,617 A * | 11/1997 | Langhans ................. | 359/205.1 |
| 5,760,369 A * | 6/1998 | Wenkman ................ | 219/121.71 |

(Continued)

FOREIGN PATENT DOCUMENTS

DE 4122273 A1 1/1992

(Continued)

*Primary Examiner* — Paul R Durand
(74) *Attorney, Agent, or Firm* — Workman Nydegger

(57) ABSTRACT

A process produces web sections from a flexible web material. The flexible web material is provided with tear-off lines at the distance of the length (L) of the web sections to be formed, which tear-off lines weaken the web material but do not bring about a complete separation of the web sections from the web material. The web sections are separated from the web material along the tear-off lines by tearing. The web material comprises a fabric made of small stretched plastic bands, and the tear-off lines are produced by laser beam processing.

3 Claims, 2 Drawing Sheets

U.S. PATENT DOCUMENTS

| | | | |
|---|---|---|---|
| 6,080,093 A | 6/2000 | Henderson et al. | |
| 6,290,391 B1 * | 9/2001 | Buchman | 383/5 |
| 6,688,515 B1 * | 2/2004 | Huffman et al. | 229/125.08 |
| 7,121,064 B2 * | 10/2006 | Ausnit | 53/412 |
| 7,215,454 B2 * | 5/2007 | Paul et al. | 359/216.1 |
| 2003/0040411 A1 | 2/2003 | Albright | |
| 2005/0276525 A1 * | 12/2005 | Hebert et al. | 383/203 |
| 2006/0014616 A1 * | 1/2006 | Baggot et al. | 493/63 |
| 2006/0199717 A1 * | 9/2006 | Marbler et al. | 493/320 |
| 2007/0298954 A1 * | 12/2007 | Plourde | 493/189 |

FOREIGN PATENT DOCUMENTS

| | | |
|---|---|---|
| DE | 100 38 104 A1 | 3/2002 |
| DT | 24 39 953 A1 | 3/1975 |
| EP | 0 398 447 A2 | 11/1990 |
| EP | 0664208 A2 | 7/1995 |
| EP | 0 891 445 B1 | 10/2001 |
| GB | 2 246 092 A | 1/1992 |
| JP | 10-296879 | 11/1998 |
| WO | 80/02393 | 11/1980 |

* cited by examiner

PROCESS FOR PRODUCING WEB SECTIONS FROM A FLEXIBLE WEB MATERIAL AS WELL AS FOR PRODUCING PACKING CONTAINERS

The invention relates to a process for producing web sections from a flexible web material, wherein the web material is provided with tear-off lines at the distance of the length of the web sections to be formed, which tear-off lines weaken the web material but do not bring about a complete separation of the web sections from the web material, and the web sections are separated from the web material along the tear-off lines by tearing.

Furthermore, the invention relates to a process for producing packing containers using web sections produced according to the invention, with an important aspect of the invention pertaining to the production of side-gussetted containers, in particular side-gussetted bags.

The manufacture of side-gussetted packings from paper has been known for many decades. In practice, such packings are produced according to the following method:
   A flat paper web is provided with straight or stepped perforation lines at the distance of the later section length.
   The flat web is formed into a tube and stuck together longitudinally.
   Subsequently, the tube sections are separated by tearing them off along the perforation lines.
   An end region of the tube section that has been torn off is formed into a bottom and stuck together.

The construction of a "pinch bottom packing" is known, for example, from U.S. Pat. No. 4,008,850, wherein, in said document, it is also suggested that a plastic-coated paper be used for the web material and that plastic-coating surfaces be stuck together.

A device for producing multi-ply paper bags comprising tube sections with a staggered arrangement of the individual paper layers is known from the document EP 664208. In order to be able to produce different formats of paper bags, the "tubing machines" used therefor exhibit variability of the distances between the transverse perforations in the individual paper layers, which distances determine the lengths of the tube sections. The distances between the transverse adhesive tapes extending in a transverse direction are also adaptable accordingly. The known device for producing a multi-ply tube from paper webs provided with transverse perforations at equal distances, from which tube sections are torn off for bag production, comprises perforating knives supported in a machine frame and fixed to a rotating shaft, which provide the paper webs with transverse perforations, wherein the radial distance of the perforating knives to the shaft is variable for format adjustment. Furthermore, transverse adhesive cylinders provided with transverse adhesive strips and cooperating with adhesive application devices are supported in the machine frame. Using a longitudinal adhesive roll, the overlapping edges of the paper webs are provided with an adhesive coating before they are turned over by guide rolls to form tubes. Four supports for perforating knives, which are optionally attachable thereto, are arranged on the rotating shaft at equal angular distances, the perforating knives having means for adjusting their radial distance to the shaft.

Placing perforation lines on paper bags is not very problematic since paper can be cut easily. In contrast, however, placing the perforation is a great challenge when side-gussetted packings are produced from synthetic fabrics or composites thereof, since cutting is problematic in case of synthetic fabrics with small bands lying on top of each other. For example, expensive punching tools, which are not very flexible and are susceptible to wear, have so far been required. Fabrics made of small stretched plastic bands are affected by those problems even if they are linked to at least one additional material layer which involves a coating of the small plastic bands or of the fabric or compounds of the fabric with other materials. Fabrics and their composites are often produced as tubular webs. It would also be desirable to find a process by means of which an offset perforation can be placed directly on said tubular webs.

The present invention solves the above-mentioned problems of the prior art by developing further the initially mentioned process for producing web sections from a flexible web material, which is a fabric made of small stretched plastic bands, by producing the tear-off lines by laser beam processing. Using a laser beam, it becomes possible to cut a fabric of small plastic bands, to perforate it or to scratch it with a defined penetration depth, although the thickness of the web material varies due to the arrangement of the small bands in the fabric at least partially on top of each other. A further advantage is that lasers are very low-maintenance and almost wear-free. Preferably, the fabric is produced from single- or multi-layered small plastic bands made of PP, PE or PET, wherein, in most cases, the small plastic bands are stretched prior to weaving in order to multiply their strength.

Due to the process according to the invention it is possible—in contrast to the prior art—to design the tear-off lines as perforation lines or weakening lines or as a combination of perforation and weakening lines, thereby creating an excellent adjustment of the detachability to the web materials to be processed.

The document DE 4122273 A1 discloses a process for laser cutting of continuously moved strips of a web or flat material. Continuous or perforated transversal (partial) cuts are thereby produced by laser in the web or flat material. The placing of weakening lines is not disclosed. Nor is it disclosed that the web sections are separated from the web material by tearing. Furthermore, the document contains no material data with regard to the web or flat material. From the drawing, it is only apparent that the web material is single-layered.

The invention is excellently applicable for web materials comprising a fabric of small plastic bands which is linked to at least one additional material layer, since the cutting capacity of the laser can be adjusted very well to various material combinations.

In one embodiment of a fabric of small plastic bands which is provided with at least one additional material layer, the additional material layer is a plastic layer such as, e.g., an OPP film, which is connected to the fabric. In a further embodiment, the additional material layer is a coating of plastic material which is applied to the small plastic bands of the fabric. In yet another embodiment, the web material is a composite material made of a fabric of small plastic bands, which optionally is coated, and at least one further composite component selected from a plastic film, metal film, metallized plastic film, nonwoven fabric (nonwoven), specific adhesive layers and/or paper. Preferred materials comprise single- or multi-layered small plastic bands made of PP, PE or PET, wherein the fabrics produced from these small plastic bands may be provided with a single- or multi-layered coating of PP, PE or specific adhesive layers. The external individual layers of such a composite may also be provided with external printing or reverse printing.

A particular advantage of the invention is that it is also applicable for a tubular web material. In order to have the possibility to perforate the tube's two layers lying on top of each other in different locations, thus placing a staggered perforation directly on a tube, it is provided that the web material of the two opposing outer surfaces is subjected to laser beam processing.

Of course, the invention is also applicable for a flat web material.

In a preferred embodiment of the invention, the laser beam is guided through a scanner unit along the predefined tear-off line, wherein, in case of a tubular web material, laser sources and scanner units may be arranged on the top side and on the bottom side of the tubular web. By deflecting the laser beam with a scanner it becomes possible to move along almost any desired outline of the tear-off line while the web material is being moved under the laser, whereby the outline can very easily be adjusted to the dimensions of the packing in a software-controlled manner.

In order to realize different penetration depths or permeation depths of the laser beam into the web material, it is provided in one embodiment of the invention that, when the laser beam is being guided along the predefined tear-off line, the laser energy (more precisely: the energy density at the point of impact on the web material) is altered according to the intended penetration depths into the web material.

The invention enables the tear-off line to be produced while the web material is being moved continuously by guiding the laser beam along in such a way that the longitudinal motion of the web material is counterbalanced, whereby the laser energy is optionally adjusted to the respective distance between the laser source and the point of impact on the web material in order to always provide the desired laser energy at the point of impact. It is possible to keep constant the energy density at the point of impact with an expanding beam by adjusting the laser power to the distance between the laser source and the web material.

For controlling the penetration depth of the laser beam into the web material, it may furthermore be provided that the power of the laser source is adjusted depending on the relative speed of the laser beam with respect to the web material or that the relative speed of the laser beam is adjusted with respect to the web material. The energy introduced into the web material by the laser beam is thus determined per unit of length of the tear-off line.

Furthermore, using the invention, any desired web section requiring a stepped web end section can be produced, since stepped tear-off lines can be generated by the laser beam without any problems.

The process according to the invention for producing web sections from a flexible web material is excellently suitable for use in a process for the production of packing containers, in particular side-gussetted packings, wherein the web sections are torn off from the web material after the tear-off line has been produced in the web material by laser. For the manufacture of a bottom and a top surface, respectively, at least one end region of the web section is folded over the web section body and the end region that has been folded over is fastened to the web section body by gluing or welding. Folding-over can be done once or repeatedly.

If a flat web material is used, the web sections are longitudinally formed into a tube before they are torn off so that the longitudinal edges will overlap, which edges will subsequently be connected, in particular glued or welded, to each other in order to produce a longitudinal seam.

For the production of side-gussetted packings, in particular side-gussetted bags, at least one longitudinal fold is formed in the web sections, preferably before the web sections are torn off from the web material.

The invention is now illustrated in further detail in a non-limiting way based on exemplary embodiments with reference to the drawings. In the drawings FIG. 1 shows a perspective view of a tubular web material in which tear-off lines are placed according to the invention;

Figure 1:
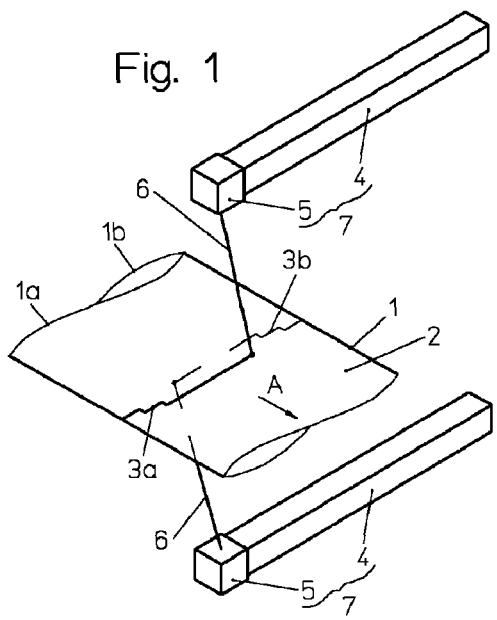

At first, the process according to the invention for producing web sections 2 from a flexible web material 1 is now illustrated with reference to FIG. 1. The flexible web material is conveyed to a perforating station in the longitudinal direction (arrow A) by conventional means of conveyance, for example, roll pairs (not illustrated). In said exemplary embodiment, the web material 1 is tubular, being flatly folded so that an upper (1a) and a lower (1b) material web lie on top of each other. The web material 1 comprises a fabric of small plastic bands which preferably consist of PP, PE or PET and suitably were stretched prior to weaving. The small plastic bands can have a single- or multi-layered design. The fabric can be linked to at least one additional material layer. In one variant, the additional material layer is a single- or multi-layered plastic layer, in particular made of PP, PE, or an OPP film, or comprises specific adhesive layers. In a further variant, the additional material layer is a single- or multi-layered coating of plastic material which is applied to the small plastic bands of the fabric. In yet another variant, the web material is a composite material made of a fabric of small plastic bands, which optionally is coated, and at least one further composite component selected from a plastic film, metal film, metallized plastic film, nonwoven fabric (nonwoven), specific adhesive layers and/or paper. The external individual layers may also be provided with external printing or reverse printing.

Figure 2:
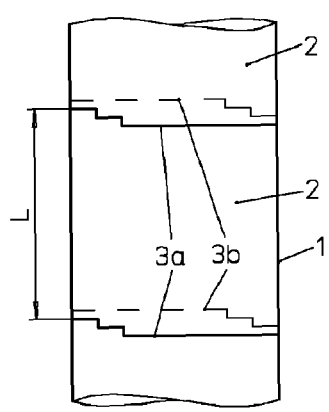
FIG. 2 shows a top view of the tubular web material treated according to the invention.

The perforating station to which the web material 1 is conveyed comprises two laser cutting units 7, each comprising a laser source 4 for generating a laser beam 6 and a scanner 5 for deflecting the laser beam 6. A first laser cutting unit 7 is arranged above the tubular web material 1, with its laser beam directed at the outer surface of the upper material web 1a. The second laser cutting unit 7 is arranged underneath the tubular web material 1, with its laser beam directed at the outer surface of the lower material web 1b. The two laser cutting units 7 have the function of providing the web material 1 with tear-off lines 3a, 3b at the distance of the length L (see FIG. 2) of web sections 2 to be formed, which tear-off lines will indeed weaken the web material 1 but will not bring about a complete separation of the web sections 2 from the web material 1. The tear-off lines 3a, 3b produced in the web material 1 and the web sections 2 are illustrated in top view in FIG. 2.

The two laser cutting units 7 operate independently of each other, with the energy of the respective laser beam 6 being adjusted such that it cuts a tear-off line 3a, 3b only into the material web 1a or 1b associated to it without, however, damaging the other material web 1b or 1a. The tear-off lines are shaped by the laser beam 6 as perforation lines 3a-1 (see FIG. 4) or weakening lines 3a-2 (see FIG. 5) or as a combination of perforation and weakening lines 3a-3 (see FIG. 6).

After the formation of the tear-off lines 3a, 3b, the web sections 2 can be torn off from the web material 1 and processed further in a known manner.

The tear-off lines 3a, 3b may have most diverse outlines, in particular, they may be stepped multiple times. The laser beam 6 is guided by the scanner 5 along the outline of the tear-off line, which outline has been predefined by software, whereby said outline is easily changeable and thus the process according to the invention displays great variability. Using the invention, it is in particular also possible to control and alter the energy of the laser beam while said beam is being guided along the predefined tear-off line in order to generate, for example, a combination of perforation and weakening lines or in order to keep constant the energy of the laser beam despite a variable distance between the laser source 4 and the point of impact of the laser beam 6 on the material web 1a, 1b. By controlling the laser energy it is also possible to perforate material webs with changing material properties (thickness, composition of the composite, etc.).

An additional advantage of the invention is that the web material 1 can continuously be moved further along direction A while the tear-off lines 3a, 3b are being cut by the laser beam 6. In doing so, the laser beam 6 is guided along the movement of the web material in such a way that the longitudinal motion (A) of the web material 1 is counterbalanced. Optionally, the laser energy can be adjusted to the respective distance between the laser source 6 and the point of impact of the laser beam 6 on the web material 1.

The energy introduced per unit of length and hence the penetration depth are determined by the power of the laser source 4 and the relative speed of the laser beam 6 with respect to the web material 1.

Figure 3:
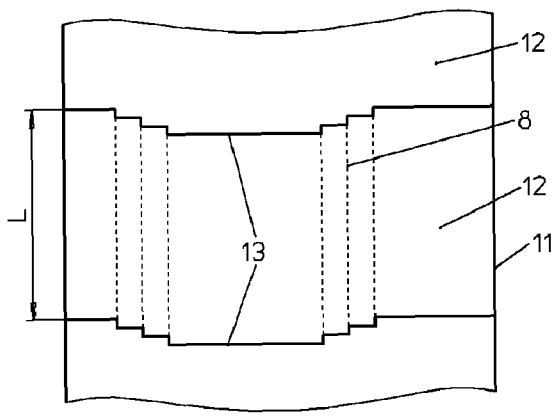
FIG. 3 shows a top view of a flat web material in which tear-off lines are placed according to the invention.

Apart from in the tubular web material 1, tear-off lines 13 can also be formed in a flat web material 11 using the laser cutting according to the invention so as to produce web sections 12 as illustrated in top view in FIG. 3. Only one laser cutting unit 7 is required for a flat web material 11. It should be pointed out that, depending on the outline of the tear-off lines 3a, 3b, it might perhaps be possible to get by with one laser cutting unit 7 also in case of a tubular web material 1.

With the aid of the process according to the invention for producing web sections 2, 12 from a flexible web material 1, 11 by laser cutting, it is possible to manufacture packing containers by first producing the web sections 2, 12 by generating the tear-off lines 3a, 3b, 13 and subsequently tearing off the web sections 2, 12 from the web material 1, 11, thereafter folding at least one end region of the web section 2, 12 over itself and over the web section body, respectively, once or repeatedly and fastening the end region that has been folded over to the web section body by gluing or welding. If a flat web material 11 is used, the web sections 12 are longitudinally formed into a tube with overlapping longitudinal edges before they are torn off, which edges will be connected, in particular glued or welded, to each other.

Furthermore, in the material tube that has been produced, at least one longitudinal fold 8 can be formed in the web sections 2, 12, preferably before the web sections 2, 12 are torn off from the web material 1, 11. Side-gussetted packings, in particular side-gussetted bags, can thus be produced.

Figure 6:
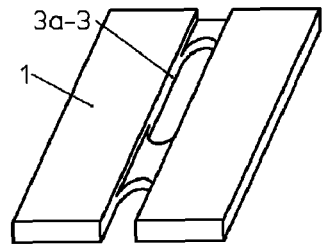
Figure 7:
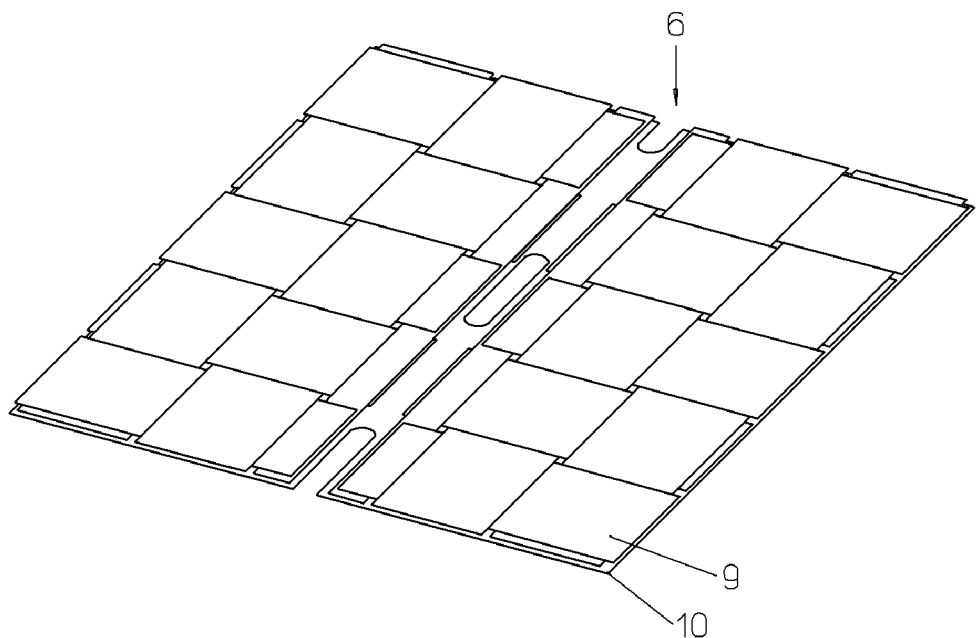
FIG. 7 shows the application of scratching as illustrated in FIG. 6 plus perforating for a flat web made of a compound consisting of a fabric of small plastic bands and a film.

FIG. 7 shows the application of the method described in FIG. 6 (weakening plus perforated sections) for a flat web consisting of a compound made of a fabric of small plastic bands 9 and a film 10, e.g., a plastic film, in particular an OPP film, or a metal film or metallized plastic film. Thereby, the laser beam hits the fabric side (which will later form the inside of the packing), cuts through most of the fabric 9 but perforates the remaining film 10 only in a small number of locations (preferably in locations extending along the direction of the web). It can thereby be achieved that the web can later be torn off neatly at the perforation lines.

Figure 4:
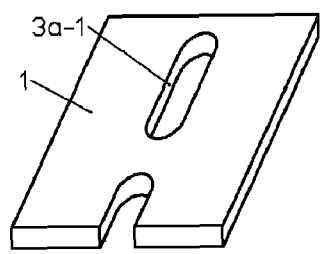
FIGS. 4 to 6 show perspective views of tear-off lines produced in a web material according to the invention.
Figure 5:
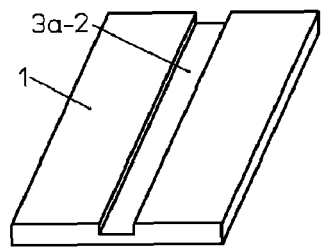
Figure 8:
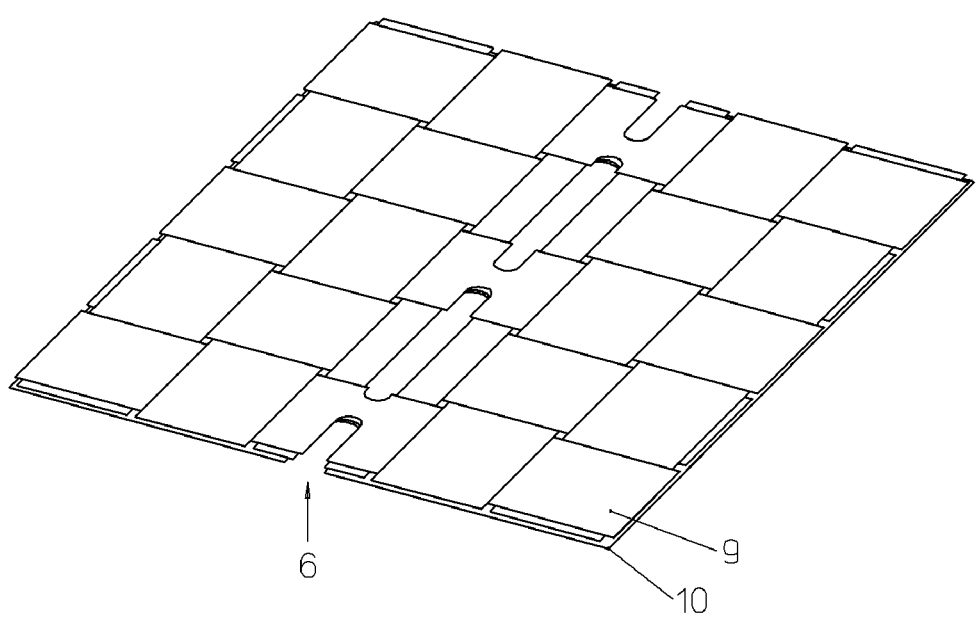
FIG. 8 shows the application of perforating as illustrated in FIG. 4 for a tubular web made of a compound consisting of a fabric of small plastic bands and a film.

FIG. 8 shows the application of perforating as illustrated in FIG. 4 for a tubular web made of a compound consisting of a fabric of small plastic bands 9 and a film 10. Thereby, the laser beam hits the film side (which will later be the outside of a packing produced therefrom) and, in sections, cuts through the web completely. The remaining ribs must be narrow, and possibly they are also weakened (scratched) as shown in FIG. 6 so that, later, the tube sections can be separated neatly. Locations extending along the direction of the web must in any case be cut through completely and must not exhibit any ribs.

The invention claimed is:

1. A process for producing packing containers, comprising:
producing web sections from a flexible web material, wherein the web material is provided with tear-off lines at a distance of a length (L) of the web sections to be formed, which tear-off lines weaken the web material but do not bring about a complete separation of the web sections from the web material, wherein the web sections are separated from the web material along the tear-off lines by tearing, wherein the web material is a fabric made of small stretched plastic bands and that the tear-off lines are produced by laser beam processing, wherein producing web sections further comprises:
guiding a laser beam through a scanner unit along the predefined outline of the tear-off line, and
when the laser beam is being guided along the predefined outline of the tear-off line, altering the laser energy of the laser beam according to the intended penetration depths into the web material,
tearing off the web sections from the web material,
folding at least one end region of the web section over the web section body at least once, and
fastening the end region that has been folded over to the web section body by gluing or welding.

2. A process for producing packing containers according to claim 1, wherein, if a flat web material is used, the web section are longitudinally formed into a tube before they are torn off so that the longitudinal edges will overlap and will subsequently be connected, in particular glued or welded, to each other.

3. A process for producing packing containers according to claim 1, wherein at least one longitudinal fold is formed in the web sections, preferably before the web sections are torn off from the web material.

* * * * *